UNITED STATES PATENT OFFICE.

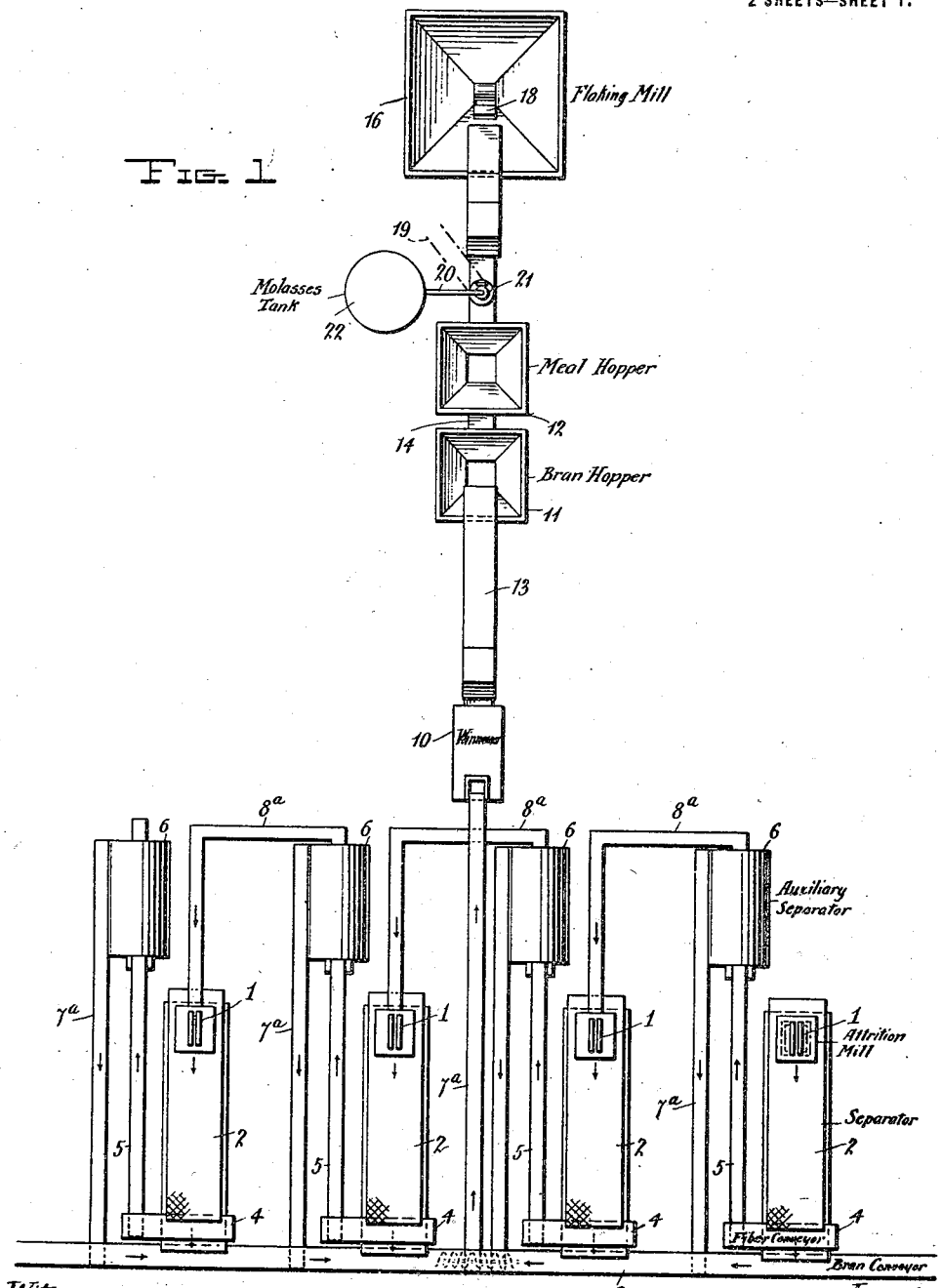

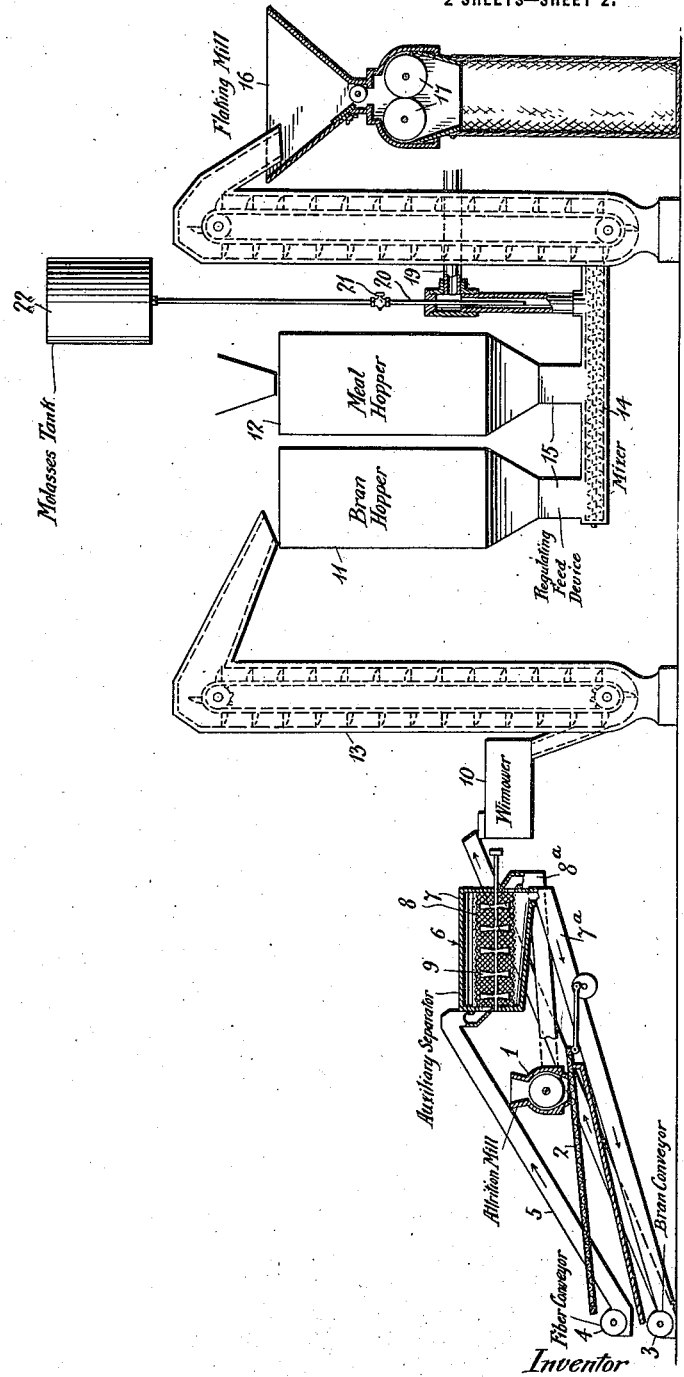

ORLANDO SHEPPARD, JR., OF ASHBURN, GEORGIA.

PROCESS OF MANUFACTURING STOCK FOOD.

1,199,621.	Specification of Letters Patent.	Patented Sept. 26, 1916.

Application filed April 20, 1916. Serial No. 92,544.

*To all whom it may concern:*

Be it known that I, ORLANDO SHEPPARD, Jr., a citizen of the United States, residing at Ashburn, in the county of Turner and State of Georgia, have invented new and useful Improvements in Processes of Manufacturing Stock Food, of which the following is a specification.

This invention relates to a process for manufacturing stock food, proposing a process which is more especially applicable for the production of a food composed of a carbo-hydrate supplying bran and a protein supplying meal which is preferably applied to the treatment of cotton seed products.

The invention has for its principal object to produce a stock food of the character stated wherein the mixture will not only be proportioned to provide a balanced ration, but will be in such a form that neither of its constituents can be rejected, in feeding, accidentally or otherwise, in favor of the other constituent; to produce a stock food in which the cotton seed hull bran is in the most palatable and most digestible form; and to provide a process which can be practised continuously and inexpensively and which will insure of a thorough blending and a correct proportioning of the constituents in a product which, in lightness, compares favorably with forage, and, in form, is permanently homogeneous.

Briefly stated, the process preferably consists in thoroughly mixing relatively coarse bran, preferably obtained from the hulls of cotton seed, with a meal, preferably cotton seed meal, but, in any event, a meal which will supply the proper proportion of protein and will have an affinity for the bran, in certain definite and predetermined proportions and in forming the mixture into relatively light and coarse flakes in which the bran and the cotton seed meal are matted together and are permanently adherent. In the production of a food in which cotton seed hull bran is an ingredient, the process includes as an initial or preliminary step the treatment of the hull to substantially free it from cotton fiber and as a subsequent step the formation of the hull into flakes, preferably with the addition of a meal of the character stated.

An apparatus for practising the process is illustrated in the accompanying drawings, wherein—

Figure 1 is a diagrammatic plan view; and Fig. 2 is a diagrammatic side elevation with certain parts shown in section.

Where the process is applied to cotton seed products, as is preferred, the raw material with which the process is commenced is the residue or waste of an ordinary cotton seed huller, being a product which is similar to the moss of mote and fiber obtained from a cotton seed linter. It is important that the bran should be substantially free from fiber or lint. For this purpose, the raw material is preferably treated in a series of attrition mills 1 which, in conjunction with their appurtenances, effect a thorough separation of the fiber and the hull and a complete recovery of the hull and reduce the hull to coarse bran. Any desired number of attrition mills may be employed, but good results have been obtained with a gang composed of four of such mills. Each mill 1 delivers its ground product into a separator 2, preferably a vibratory shaker. The bran falls through the separators 2 into a bran conveyer 3 which is common to the mills. The fiber from the shakers, together with unseparated bran adhering thereto, passes into fiber conveyers 4, one for each mill. From the fiber conveyers 4 the material is carried, preferably by drag conveyers 5, to auxiliary separators 6, of which there is one for each mill. The separators 6 are preferably of the well known centrifugal type and comprise an outer cylindrical shell 7, an inner cylindrical screen 8 and a rotary beater 9 working in the screen 8. The bran is forced through the screen 8 into the outer shell 7, from which it is returned to the bran conveyer 3 in any suitable manner, e. g., by a spout or chute 7ª. The fiber from the auxiliary separator 6 of the last mill is delivered into any suitable receptacle and is ready for any commercial applications for which it may be adapted. The fiber from each of the remaining separators is conducted from the screen 8 by any suitable means 8ª to the hopper of the next succeeding mill, by which it is re-ground. By these successive grindings of the fiber all of the hull is completely recovered and reduced to coarse bran and the fiber which is discharged from the last auxiliary separator is substantially free from all particles of hull.

To insure of the complete or substantially complete elimination of fiber, it is preferred to treat the bran in a winnower or equivalent machine 10 to which the bran is carried from the conveyer 3 by any suitable means. As a matter of convenience, the conveyer 3 consists of a pair of oppositely directed screws arranged in tandem and has a centrally located bran discharge by which the bran is passed to the conveyer for transporting it to the winnower 10. In the winnower any particles of fiber which may escape the action of the separators 2 and 6 and which, of necessity, will be very minute and light, are finally separated, the bran as it issues from the winnower being substantially free from fiber and ready for use as a constituent of the food. The bran from the winnower 10 is mixed with the meal, preferably cotton seed meal, which I have found to have a pronounced affinity for cotton seed hull bran and, therefore, especially adaptable for food of the character noted. The apparatus for mixing the bran and the meal includes a bran hopper 11 and a meal hopper 12, the bran being conveyed from the winnower 10 to the hopper 11 by a conveyer 13 of any suitable construction. The hoppers 11 and 12 discharge into a receptacle which forms an element of a mixer 14 by which a thorough and uniform blending of the bran and the meal is effected.

It is important that the mixture from which the food is to be prepared should have its constituents correctly proportioned to provide a balanced ration suitable for particular conditions or particular kinds of stock. For cattle, the ration may advantageously contain one part by weight of protein for six parts by weight of carbohydrates, and in such case there will be seven pounds of bran to every three pounds of meal. To insure the correct proportioning of the constituents of the mixture, a regulating feed device 15 of any suitable construction is interposed between each of the hoppers 11 and 12 and the mixer 14. The feed regulators 15 may be adjusted to cause the material from each hopper to flow at a predetermined rate into the mixer 14 and thus to provide for any desired proportioning of the constituents of the mixture. From the mixer 14 the dry mash is carried to a mash hopper 16. As a matter of convenience, the mixer 14 may have the form of an ordinary spiral conveyer or of a spiral conveyer with a "cut flight", i. e., with its screw cut away at regular intervals, to facilitate the mixing of the ingredients, and in such a case, the mixer will constitute an element of the conveyer for transporting mash to the hopper 16. From the hopper 16, the mash is passed to a pair or series of rolls 17 which are constructed and arranged to form the mash, when fed thereto at a correct rate, into flakes. A feed regulator 18 of any suitable construction is arranged between the hopper 16 and the rolls 17 for the purpose of insuring that the mash shall be passed to said rolls at the rate necessary to insure its flaking. The product which issues from the rolls 17 consists of relatively coarse flakes, light in weight, and in which the bran and meal are matted together and have permanent adherence. These flakes will be thin and flat and will range in size from a quarter of an inch square to an inch square, more or less. However, the flakes, regardless of their size, will be dry magmas of meal and bran and the food, composed of such flakes, will, therefore, be homogeneous. In some cases, it may be desirable to have the flakes of very large size, say two or three inches square. This result can be obtained by introducing steam at a relatively low temperature into the conveyer-mixer 14, the steam being supplied by a pipe 19. It may also be desired, in some cases, to incorporate molasses into the food for the sake of its laxative properties and also to increase the percentage of carbohydrates. For this purpose, a molasses pipe 20 having a controlling valve 21 and leading from a tank 22 may be arranged to project for some distance into the steam pipe 19. The valve 21 will be arranged to provide for a dribbling flow of the molasses from the pipe 20 and the molasses thus dropping into the pipe 19 will be taken up by or into solution with the steam delivered into the mixer 14. The molasses is, however, not necessary as a binder for the constituents of the flakes. In some cases, it may be desired to have the flakes composed of cotton seed hull bran without the meal. In such cases, the process is practised as above described, with or without the addition of molasses, but with the meal omitted. The flakes are very light, thin, and palatable but are considerably smaller in area than the flakes wherein the bran and the meal are matted together.

I claim—

1. A process for manufacturing stock food which consists in thoroughly mixing relatively coarse bran and meal having a physical affinity for one another and in rolling the mixture into the form of light thin flakes wherein each flake is a dry magma or mat of the bran and meal.

2. A process for manufacturing stock food which consists in feeding relatively coarse bran and meal at a predeterminately proportioned rate into a common receptacle, in thoroughly mixing the bran and meal in said receptacle, in continuously conveying the mixture to a rolling medium and feeding the mixture to said medium at a predetermined rate and in continuously rolling the mixture into the form of light thin flakes wherein each flake is a dry magma or mat of the bran and meal.

3. A process for manufacturing stock food which consists in treating cotton seed hull to reduce it to coarse bran and in separating fiber therefrom, in thoroughly mixing the coarse bran with cotton seed meal, and in rolling the mixture into the form of light thin flakes wherein each flake is a dry magma or mat of the bran and meal.

4. A process for manufacturing stock food which consists in feeding relatively coarse bran and meal at predeterminately proportioned rates into a common receptacle, and thoroughly mixing the bran and meal in said receptacle, in continuously conveying the mixture to a rolling medium and feeding the mixture to said medium at a predetermined rate, in injecting steam into the mixture during its transfer to the rolling medium, and in continuously rolling the mixture into the form of light thin flakes wherein each flake is a dry magma or mat of the bran and meal.

5. A process for manufacturing stock food which consists in treating cotton seed hull to reduce it to coarse bran and in separating fiber therefrom, in thoroughly mixing the coarse bran with cotton seed meal, in continuously conveying the mixture to a rolling medium and feeding the mixture to said medium at a predetermined rate, and in continuously rolling the mixture into the form of light thin flakes wherein each flake is a dry magma or mat of the bran and meal.

6. A process for manufacturing stock food which consists in thoroughly mixing relatively coarse bran obtained from cotton seed hull and from which the fiber has been eliminated and cotton seed meal and in rolling the mixture into the form of light thin flakes wherein each flake is a dry magma or mat of the bran and meal.

7. A process for manufacturing stock food which consists in thoroughly mixing coarse bran and meal having a physical affinity therefor, in introducing steam saturated with molasses into the mixture and in rolling the mixture into the form of light thin flakes wherein each flake is a dry magma or mat of the bran and meal.

8. A process for manufacturing stock food which consists in treating cotton seed hull to free it from lint and in forming the hull from which all lint has been separated into light thin flakes.

9. A process for manufacturing stock food which consists in treating cotton seed hull to free it from lint, thereafter in adding molasses and finally in forming the hull into light thin flakes.

In testimony whereof I have hereunto set my hand in presence of two subscribing witnesses.

ORLANDO SHEPPARD, Jr.

Witnesses:
   CHAS. S. HYER,
   JOHNS POWERS.